United States Patent [19]

Takahashi et al.

[11] 4,348,900
[45] Sep. 14, 1982

[54] ANGULAR VELOCITY SENSOR

[75] Inventors: Fumitaka Takahashi, Houya; Hiroshi Gotoh, Asaka, both of Japan

[73] Assignee: Honda Giken Kogyo Kabushiki Kaisha, Tokyo, Japan

[21] Appl. No.: 155,428

[22] Filed: Jun. 2, 1980

[30] Foreign Application Priority Data

Jun. 8, 1979 [JP] Japan .................. 54-77877[U]

[51] Int. Cl.³ .................. G01P 15/08; G01P 3/26
[52] U.S. Cl. .................. 73/505; 73/516 LM
[58] Field of Search .................. 73/505, 516 LM, 515

[56] References Cited

U.S. PATENT DOCUMENTS

| | | | |
|---|---|---|---|
| 928,701 | 7/1909 | Rietzel | 219/93 |
| 2,505,636 | 4/1950 | Carter | 73/505 |
| 3,587,328 | 6/1971 | Schuemann | 73/516 LM |
| 3,635,095 | 1/1972 | Schuemann | 73/505 |
| 4,020,700 | 5/1977 | Lopiccolo et al. | 73/516 LM |

*Primary Examiner*—James J. Gill
*Attorney, Agent, or Firm*—Lyon & Lyon

[57] ABSTRACT

An angular velocity sensor comprising an outer casing, an inner casing forming the sensor body, mounted within the outer casing, and a covering member covering an opening formed in an end of the outer casing. The inner casing includes a hollow cylindrical portion, an end wall provided at one end of the hollow cylindrical portion and formed with a central axial nozzle hole, a gas flow sensor holding portion provided within the hollow cylindrical portion in spaced and concentrical relation to the nozzle hole, and a pump housing portion provided within an opening formed in an end of the inner casing, wherein at least the hollow cylindrical portion, the end wall and the gas flow sensor holding portion are integrally formed of a one-piece structure. The outer casing may have an open end closed in an airtight manner by a hermetically sealing member serving as the covering member and formed with an annular protuberance at a periphery thereof, by means of projection welding. The outer casing, the sensor body and the covering member or hermetically sealing member may be fabricated separately, followed by welding together the outer casing and the covering member after incorporation of the sensor body into the outer casing.

1 Claim, 12 Drawing Figures

ANGULAR VELOCITY SENSOR

BACKGROUND OF THE INVENTION

This invention relates to improvements in or to an angular velocity sensor for detecting the angular velocity of an object through deflection of a gas flow.

Angular velocity sensors generally called "gas rate sensors" are used in the course adjustment or position control of a ship, an automotive vehicle, etc. Those angular velocity sensors are more resistant to vibrations than gyrocompasses and are capable of detecting the angular velocity of a ship or an automotive vehicle with higher sensitivity and more excellent responsiveness than gyrocompasses.

An angular velocity sensor in general comprises a casing, a sensor body mounted within the casing and including a nozzle and a gas flow sensor composed of thermo-sensitive elements and a cover covering the opening of the casing and forming part of the wall of a pumping chamber defined within the casing. Such angular velocity sensor operates for detecting the angular velocity of an object in which it is mounted, in such a manner that a gas supplied from the pumping chamber is jetted toward the thermo-sensitive elements through the nozzle. A change in the output of the gas flow sensor which is caused by deflection of the gas stream under the influence of angular velocity movement of the object is detected to thereby determine the angular velocity value.

In a conventional angular velocity sensor, the sensor body is comprised of a cylindrical sleeve, a nozzle piece secured to one end of the sleeve and formed therein with a nozzle hole at a diametrical center thereof and a gas flow sensor holder secured to the other end of the sleeve for holding a gas flow sensor composed of a pair of thermo-sensitive elements arranged symmetrically with respect to the diametrical center of the sleeve. A gas flow jetted toward the thermo-sensitive elements through the nozzle hole is deflected due to external angular velocity movement of an object applied to the angular velocity sensor, which results in a difference between the values of radiant heat of the gas stream sensed by the two thermo-sensitive elements. The resulting outputs of the two thermo-sensitive elements are different from each other by an amount corresponding to the actual angular velocity. The angular velocity of the object is thus detected.

Since, as mentioned above, the angular velocity sensors of this kind are adapted to detect the value of angular velocity applied thereto in response to a fine difference between the gas radiant heat amounts which the two thermo-sensitive elements undergo, it is requisite that the axis of the nozzle hole and the center of a line connecting the two thermo-sensitive elements (hereinafter called "symmetrical center") should be in exact alignment with each other to obtain accurate operation of the sensor. However, in the conventional angular velocity sensor, the aforementioned sleeve and nozzle piece are made of separate pieces and further, the gas flow sensor holder is mounted within the angular velocity sensor casing via a separate plate member. Consequently, errors occur in locating these parts during assemblage thereof so that the symmetrical center of the two thermo-sensitive elements and the axis of the nozzle hole are out of alignment, which results in the occurrence of gas turbulences in the space between the thermo-sensitive elements and the nozzle hole, impairing the detecting accuracy of the angular velocity sensor.

Moreover, the conventional angular velocity sensor is composed of many parts. Therefore, it takes much time to assemble and adjust these parts, and accumulated errors occur in locating these parts during assemblage, badly affecting the whole sensor performance.

Further, since detection of the angular velocity value depends upon a fine difference in the gas radiant heat amount which the two thermo-sensitive elements undergo as mentioned above, the gas flow jetted from the nozzle hole should have a perfect streamline shape. To this end, a gas which has a fine molecular size and accordingly is excellent in streamline flow property is conventionally used. However, an ordinary gas sealing method is unable to completely prevent leakage of such small molecular gas from the sensor casing, resulting in that the angular velocity sensor undergoes gas leakage after a long period of use.

OBJECTS OF THE INVENTION

The present invention is intended to overcome the above-mentioned disadvantages of the conventional angular velocity sensors and it is a primary object of the invention to provide an angular velocity sensor which has a one-piece structure in which a nozzle piece, a sleeve, a flow sensor holder, a pumping chamber, etc. are integrally formed. The angular velocity sensor therefore has a minimum of locating points for assemblage of the component parts and accordingly provides high precision with an enhanced concentricity of the nozzle hole with the thermo-sensitive elements, thus allowing mass production.

It is another object of the invention to provide an angular velocity sensor and a manufacturing method for same, wherein the whole sensor is composed of a sensor body, a casing and a closing cover each of which has a unit construction, these unit parts are separately manufactured, and thereafter the sensor can be completed with ease merely by assembling these unit parts.

It is a further object of the invention to provide an airtight sealing method for an angular velocity sensor, which provides positive sealing against leakage of gas contained in the angular velocity sensor.

The above and other objects, features and advantages of the invention will be more apparent upon reading the ensuing detailed description and the accompanying drawings.

DETAILED DESCRIPTION

Figure 1:
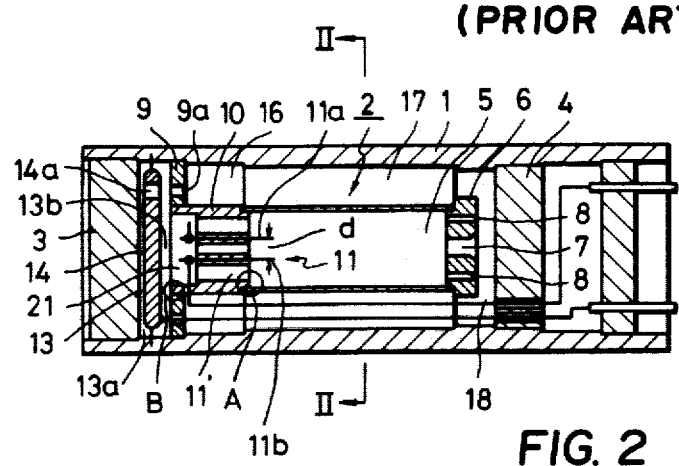
FIG. 1 is a sectional front view of a conventional angular velocity sensor.

Referring now to the drawings, wherein like reference characters designate like or corresponding parts throughout all the views, FIG. 1 shows the structure of a conventional angular velocity sensor. In FIG. 1, reference numeral 1 designates a casing within which a sensor body 2 is integrally formed, with its opposite ends closed by end plates 3 and 4, respectively. The sensor body 2 has a hollow cylindrical sleeve 5 formed by machining part of the casing 1, to one end of which is secured a nozzle piece 6 which is formed therein with a nozzle hole 7 and a plurality of rectifying holes 8. A holder 10 is secured to the casing 1 by means of the sleeve 5 and a plate member 9, on which holder is mounted a gas flow sensor 11 which comprises a pair of thermo-sensitive elements 11a, 11b. The thermo-sensitive elements 11a, 11b are arranged in opposed and spaced relation to the nozzle hole 7.

A pump chamber 13 is defined within the casing 1 by the plate member 9 and the end plate 3, in which chamber a piezo-plate 14 having an orifice 14a is placed. This piezo-plate 14 is adapted to vibrate upon energization when supplied with electric current, to serve as a pumping element.

With this arrangement, when the piezo-plate 14 is energized for displacement in the direction of increasing the volume of the suction side space 13b of the pump chamber 13, gas is guided into the delivery side space 13a of the chamber 13 from the suction side space 13b through the orifice 14a. Then, when the piezo-plate 14 is displaced in the direction of decreasing the volume of the suction side space 13b, gas is ejected from the space 13a through the orifice 14a and guided through the suction side space 13b and the delivery bore 9a formed in the plate member 9 into a pressure chamber 16 where the gas expands. The expanded gas then travels in a gas passage 17, again expands in a nozzle chamber 18 and is forced into the sleeve 5 through the nozzle hole 7 and the rectifying holes 8. The gas introduced into the sleeve 5 is guided through holes 11' in the gas flow sensor 11 into an exhaust gas chamber 21 and again returned into the suction side space 13b. By repeating this cycle, the gas is circulated in a closed loop formed within the angular velocity sensor.

According to the conventional angular velocity sensor constructed as above, the gas flow ejected through the nozzle hole 7 into the sleeve 5 may assume either a laminar or streamline flow shape or a turbulent flow shape depending upon the gas flow velocity V, the diameter of the nozzle hole 7 and a constant $\nu$ representing the nature of the gas (kinematic coefficient of viscosity). Since the angular velocity sensor of this kind is adapted to detect angular velocity by utilizing a slight difference in the gas radiant heat distribution (flow velocity distribution) applied to the two thermo-sensitive elements as hereinafter described in detail, the gas flow must have a perfect streamline flow shape with no turbulence in the closed loop. To this end, the Reynolds number R (dimensionless number) which is given by the following formula must be as small as possible by selecting the values of gas flow velocity V and nozzle hole diameter D:

$$R = VD/\nu \quad (1)$$

Figure 3:
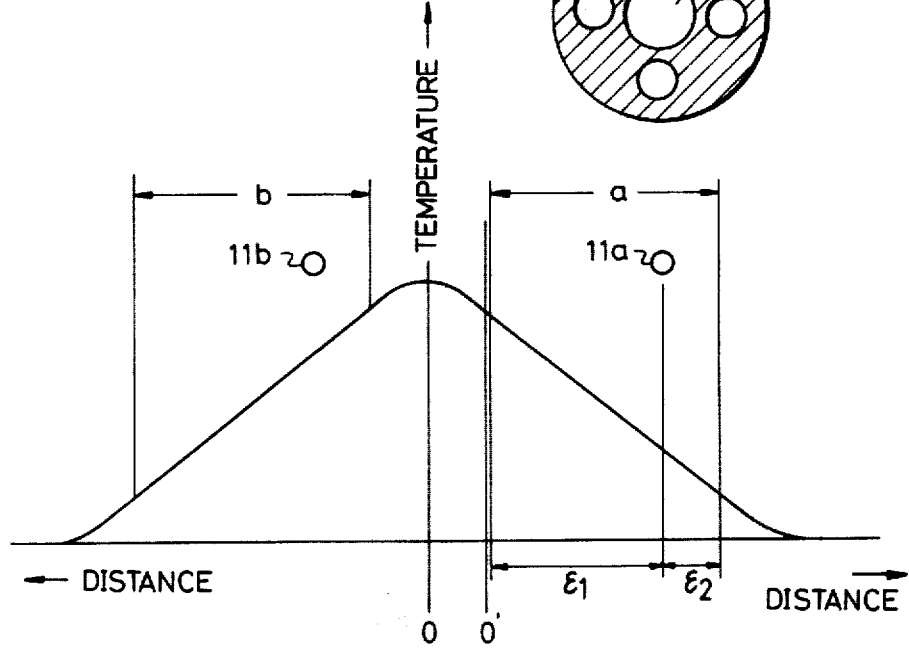
FIG. 3 is a graph showing the radiant heat distribution of a gas jet in an angular velocity sensor.
Figure 4:
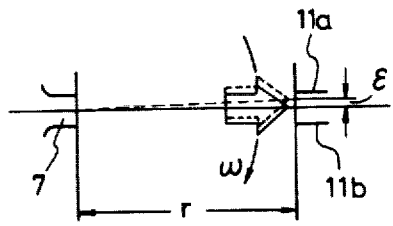
FIG. 4 is a schematic view showing the deviation of a gas jet under the influence of angular velocity applied to the angular velocity sensor.

The streamline shape of gas flow ejected from the nozzle hole 7 has a radiant heat distribution characteristic shown in FIG. 3 in the vicinity of the gas flow sensor 11 arranged at a certain distance from the nozzle hole 7. It is noted from FIG. 3 that the radiant heat distributions within the ranges a and b, present linear curves approximate to each other. Therefore, the two thermo-sensitive elements 11a, 11b of the gas flow sensor are located at the centers of the linearly changing ranges a and b at the opposite sides of the axis O of the gas jet in a symmetrical fashion (FIG. 1), to detect changes in the radiant heat amount. As shown in FIG. 4, when the angular velocity sensor is stationary, gas is allowed to flow along a center line indicated by the solid line so that the two thermo-sensitive elements 11a, 11b of the gas flow sensor 11 receive equal radiant heat amounts to supply equal outputs. When the angular velocity sensor is given angular velocity $\omega$, the gas jet undergoes a course deviation $\epsilon$ which is given by the following formula, which causes a difference between the radiant heat amounts imparted to the two thermo-sensitive elements 11a, 11b, resulting in a difference between the outputs of the two thermo-sensitive elements which represents the angular velocity value.

$$\epsilon = r^2\omega/V \quad (2)$$

where r = the distance between the nozzle hole 7 and the flow sensor 11.

It should be noted that in this type angular velocity sensor a turbulence in the gas jet has a large influence upon the detected angular velocity value, the influence being conspicuous particularly when the angular velocity being detected is small. To prevent this, the gas jet must maintain its perfect streamline flow shape. To this end, the Reynolds number must be set at a minimum possible value, as previously mentioned.

It will be understood from Formula (1) that to set the Reynolds number at a small value, either the gas flow velocity V or the nozzle hole diameter D should be set at a small value. However, if the flow velocity V is set at a small value, the radiant heat amount emitted by the gas jet becomes small, resulting in lower sensitivity of the angular velocity sensor. Therefore, the nozzle hole diameter D must be set at a minimum possible value. However, a reduction in the nozzle hole diameter D means a corresponding reduction in the cross sectional area of the gas jet, which necessitates setting the distance d between the two thermo-sensitive elements 11a, 11b smaller. As a consequence, tight machining tolerances are required so that the center of the distance d may be in alignment with the gas jet axis.

In the above-mentioned conventional angular velocity sensor, the separate fabrication of the nozzle hole 7 and the sleeve 5 as previously noted is liable to cause inaccurate location of these parts with respect to each other during assemblage, resulting in that the symmetrical center of the two thermo-sensitive elements 11a, 11b is out of alignment with the axis of the nozzle hole 7. As a consequence, a gas turbulence occurs in the space between the elements 11a, 11b and the nozzle hole 7, leading to lower angular velocity detection accuracy, as previously noted. More specifically, as shown in FIG. 3, if the difference between the axis O of the gas jet and the symmetrical center O' of the two thermo-sensitive elements 11a, 11b of the gas flow sensor 11 is large, which is due to assemblage tolerances, either the right element 11a or the left element 11b may deviate from the linearly varying radiant heat distribution range a or b when the angular velocity sensor undergoes large angular velocity, which means a decrease in the angular velocity range which can be detected with accuracy. In FIG. 3, the maximum angular velocity range that is detectable is limited to the smaller one of the values $\omega_1 = \epsilon_1 V/r^2$ and $\omega_2 = \epsilon_2 V/r^2$ corresponding, respectively, to the ranges $\epsilon_1$, $\epsilon_2$. If $\epsilon_1$ is equal to $\epsilon_2$, that is, the centers O and O' register with each other, the detectable angular velocity range becomes maximum.

Further, due to the separate fabrication of the sleeve 5 and the holder 10 for the thermo-sensitive elements 11a, 11b in the conventional angular velocity sensor, during assemblage the deviations of the sleeve 5 and the holder 10 from their proper positions on their respective bearing surfaces A, B shown in FIG. 1 are apt to be large, causing a similar disadvantage to that mentioned above. In addition, the large number of component parts as seen in FIG. 1 also invites accumulated errors in the location of these parts.

Figure 5:
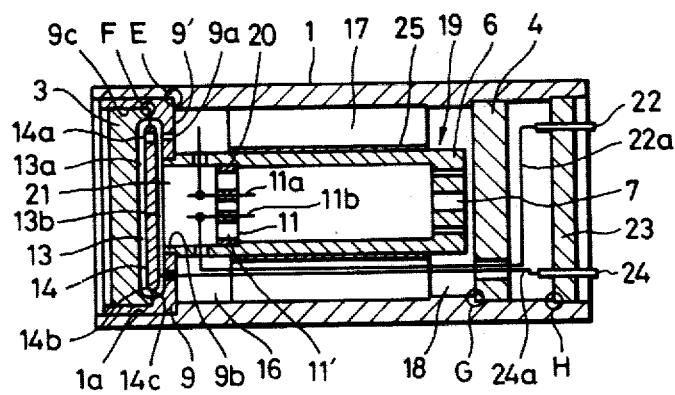
FIG. 5 is a sectional front view of an angular velocity sensor according to one embodiment of the present invention.

FIGS. 5-12 illustrate angular velocity sensors according to embodiments of the invention. FIG. 5 illustrates a first embodiment of the invention in which reference numeral 19 designates an inner casing of a one-piece structure wherein corresponding parts to the nozzle piece 6, sleeve 5 and gas flow sensor holder 10 of the aforementioned conventional angular velocity sensor are integrally formed. This inner casing 19 is illustrated in detail on an enlarged scale in FIG. 6. The inner casing 19 includes a hollow cylindrical portion 19a having a right circular cross section, and an end wall portion 6 closing one end of the cylindrical portion 19a. The hollow cylindrical portion 19a has its interior formed with a straight internal flow passage 27 axially extending therein. An axial nozzle hole 7 is formed in the end wall portion 6 at a diametrical center thereof, which communicates with the flow passage 27 and is encircled by a plurality of rectifying holes 8 also formed in the portion 6 and circumferentially arranged. In the inner wall of the inner casing 19, a gas flow sensor holding portion 10 is formed by two axially spaced annular steps 10a, 10b at a location near the other end of the cylindrical portion 19a. Two thermo-sensitive elements 11a, 11b are mounted on the holding portion 10 of the inner casing 19 by means of a support member 20. These thermo-sensitive elements 11a, 11b should preferably be made of heating wires.

The other end of the one-piece body 19 is open in communication with the internal flow passage 27 via the holder portion 10, on which end is fitted a pump holder 9. This pump holder 9 has a generally U-shaped longitudinal section with an outer diameter larger than that of the cylindrical portion 19a i.e., corresponding to the inner diameter of the open end of the outer casing 1 in which the holder 9 is held. The end of the pump holder 9 on the side of the cylindrical portion 19a is provided with an end wall 9' formed therein with a pump delivery hole 9a and a central opening 9b, while the other end of the pump holder 9 is formed as an opening 9c larger in diameter than the opening 9b, in which a pump cap 3 made of a shroud plate is fitted.

The inner casing 19 is mounted within the outer casing 1. An end plate 4 is fitted in the outer casing 1 at a rear side of the inner casing 19. Also fitted in the casing 1 at a rear side of the end plate 4 is a terminal plate 23 which carries terminals 22, 24 which are connected to the respective thermo-sensitive elements and a pumping plate 14 hereinbelow referred to by means of respective lead wires 22a, 24a.

In FIG. 5, reference numeral 13 designates a pump chamber, 13a a pump delivery side space, 13b a pump suction side space, 16 a pressure chamber, 17 a gas passage, 18 a nozzle chamber and 21 a gas chamber, respectively. Since these chambers are disposed in a similar arrangement to that in FIG. 1, detailed description is omitted with respect to same. Mounted within the pump chamber 13 by means of a flexible metal sheet 14c is a pumping plate 14 made of a piezo-plate as used in the angular velocity sensor in FIG. 1, in which plate is formed an orifice 14a in concentricity with a delivery hole 9a formed in the end wall 9' of the pump holder 9.

Figure 6:
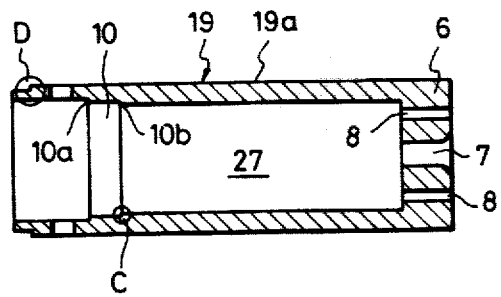
FIG. 6 is a sectional front view of a one-piece structure of a nozzle hole, a sleeve and a thermo-sensitive element holder, which is used in the embodiment of FIG. 5.
Figure 7:
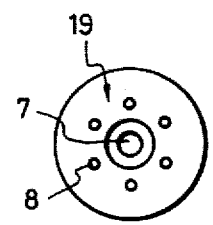
FIG. 7 is a side view of the one-piece structure of FIG. 6.

In assembling the angular velocity sensor according to the invention constructed as above, first the thermo-sensitive elements 11a, 11b are mounted at the holder portion 10 of the inner casing 19 via the support member 20 in a symmetrical arrangement with respect to the axis of the holder portion 10. On this occasion, location of the thermo-sensitive elements 11a, 11b is automatically performed merely by fixing the support member 20 onto an annular stepped bearing surface C formed in the inner peripheral wall of the inner casing 19 (FIG. 6). The inner casing 19 thus incorporating the thermo-sensitive elements is inserted into a guide portion 25 formed within the outer casing 1. Then, the pump holder 9 has its end opening 9b fitted onto an annular notched or stepped bearing portion D provided at an end of the outer peripheral surface of the inner casing 19 (FIG. 6), followed by mounting the pump plate 14 and the pump cap 3 into the pump holder 9. At this time, location of the pump holder 9 is achieved by fitting same onto an annular stepped bearing surface E formed on the inner wall of the casing 1. At the same time, the one-piece inner casing 19 engaging with the holder 9 is also located in place by means of the bearing surface E and fixed there. In mounting the pump cap 3 into the holder 9, it is located and secured on a further annular stepped bearing surface F formed on the pump holder 9, while simultaneously a flexible metal sheet 14c supporting a disc-like piezo-porcelain (piezo-plate) 14b which forms the pump plate 14 is tightly held at its outer fringe between the pump holder 9 and the pump cap 3. On the other hand, the end plate 4 is rigidly fitted on a stepped bearing surface G formed on the inner wall of the outer casing 1 and the terminal plate 23 on an annular stepped bearing surface H formed on the same inner wall, respectively.

As will be understood from the above explanation, according to the angular velocity sensor of the invention, the one-piece structure incorporating the nozzle 7, the sleeve 5 and the flow sensor holder 10 in an integral fashion makes it possible to achieve accurate location of the main parts of the angular velocity sensor which directly affects the angular velocity detecting accuracy, merely by positioning the one-piece body 19 in its predetermined place in the outer casing 1, with no further adjustment of the location of same. More specifically, according to the angular velocity sensor of the invention, the integral formation of the nozzle 7 and sleeve 5 can completely eliminate the possibility of misalignment between the two parts as well as the possibility of accumulated location errors, which were inherent in conventional angular velocity sensors. Moreover, location of the two thermo-sensitive elements 11a, 11b is performed by using the inner peripheral wall of the holder portion 10 as a guide via the support member 20 so that deviation of the symmetrical center of the elements 11a, 11b from the axis of the nozzle hole 7 can be kept at a minimum value.

Figure 2:
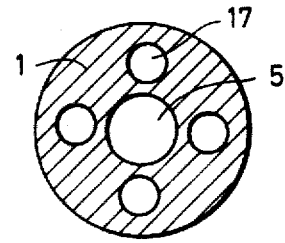
FIG. 2 is a sectional view taken on line II—II of FIG. 1.
Figure 8:
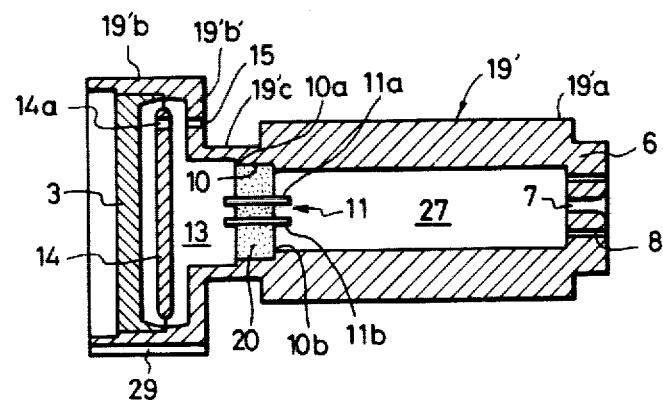
FIG. 8 is a sectional front view of the sensor body of an angular velocity sensor according to another embodiment of the present invention.

FIG. 8 illustrates the sensor body of an angular velocity sensor according to another embodiment of the invention. This sensor body includes an inner casing 19' of a one-piece structure integrally formed of a hollow cylindrical portion 19'a having a right circular cross section, a pump holder portion 19'b formed at an open end of the cylindrical portion 19'a and a neck portion 19'c connecting the two portions. That is, the sensor body of this embodiment is mainly distinguished from that of the previously described first embodiment shown in FIGS. 5–7 in that the pump holder 19'b is also formed integrally with the one-piece body 19. Further, the gas flow sensor 11, which is mounted at a gas flow sensor holding portion 10 formed in the inner wall of the inner casing 19' in the same manner as the first embodiment, includes a support member 20 which is made of ceramic. Through holes, not shown, are formed in the support member 20, which are similar to the through holes 11' shown in FIGS. 1, and 2. According to this embodiment, two thermo-sensitive elements 11a, 11b supported by the support member 20 are located by a method as hereinafter referred to, so that their symmetrical cneter may be in alignment with the axis of a nozzle hole 7 formed in the right end of the inner casing. Furthermore, the pump holder 19'b has a portion of its outer periphery formed with a locating groove 29 axially extending therein.

The other structural features of this embodiment are essentially identical with those of the previously mentioned first embodiment, and therefore description of such features is omitted here.

In the above-mentioned sensor body, as previously mentioned, it is requisite that to maintain the necessary accuracy of the angular velocity sensor of this type, the concentricity of the nozzle hole 7, the gas flow sensor holding portion 10, the symmetrical center of the thermo-sensitive elements 11a, 11b and the pump chamber 13 should be enhanced with respect to each other, and at the same time the orifice 14a in the piezo-plate 14 should be in alignment with the pump delivery hole 15 formed in an and wall 19'b' of the pump holder 19'b. To this end, according to this invention, the nozzle hole 7, the gas flow sensor holding portion 10 and the pump chamber 13 are simultaneously machined with reference to the outer periphery of the cylindrical portion 19'a of a right circular section, thus obtaining a high concentricity between them. Furthermore, formation of the holes in the support member 20 for fixing the thermo-sensitive elements 11a, 11b, the orifice 14a in the piezo-plate 14 and the pump delivery hole 15 in the pump holder 19'b is carried out at one time by inserting a jig boring plate into the place for the shroud plate 3 in the pump holder 19'b, which enables mass production of the sensors with high locating accuracy and with no variations in the location of these parts.

According to this embodiment, the one-piece construction of the whole sensor body can lead to high concentricity of the various parts therein and even reduce the possibility of gas leakage which would occur through the junctions of the component parts in the conventional angular velocity sensor. Furthermore, the ceramic support member 20 for the thermo-sensitive elements 11a, 11b not only provides high electric insulation but also enables exact centering with reference to the outer periphery of the cylindrical portion 19'a, to thereby obtain perfect symmetry of the thermo-sensitive elements with respoct to the center of the flow sensor.

Figure 9:
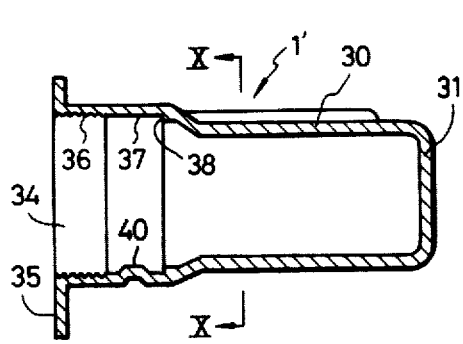
FIG. 9 is a longitudinal sectional view of a casing accommodating the sensor body shown in FIG. 8.
Figure 10:
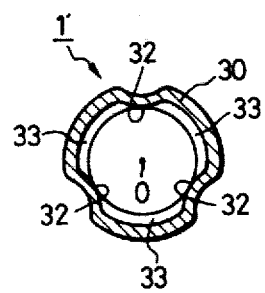
FIG. 10 is a sectional view taken on line X—X of FIG. 9.

FIG. 9 illustrates a casing 1' accommodating the sensor body 19' shown in FIG. 8. This casing 1' is formed of a one-piece structure and includes a trunk portion 30 having a hollow cylindrical shape which has an end closed by an end wall 31. The trunk portion 30 has three longitudinal protuberances 32, 32, 32 inwardly protruding from the inner peripheral wall toward the central axis O and arranged at circumferentially equal intervals, as clearly shown in FIG. 10 which shows a cross section of the trunk portion 30. Axially extending passages 33, 33, 33 are defined between adjacent protuberances 32,32 and 32 and associated outer peripheral surfaces of the inner casing 19' when the inner casing 19' is mounted within the outer casing 1'. Formed in the other end of the trunk portion 30 is an opening 34 which has its peripheral edge provided integrally with a radially outwardly extending annular flange 35. The opening 34 has its inner wall formed as a tapped hole 36 starting from an inlet edge thereof. A holder portion 37 for engagement with the holder portion 19'b of the above-mentioned sensor body is formed continuously from the tapped hole portion 36, which terminates in an annular stepped surface 38 also formed in an intermediate inner wall of the casing 1'. The holder portion 37 further includes a locating protuberance 40 radially inwardly projected from the inner wall thereof for engagement with the locating groove 29 of the holder portion 19'b of the inner casing 19'.

Figure 11:
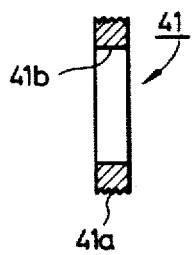
FIG. 11 is a longitudinal sectional view of a retaining ring intended to be fitted in the opening of the sensor body of FIG. 8.

FIG. 11 illustrates a retaining ring 41 which is to be fitted into the tapped hole 36 of the outer casing 1' (FIG. 9). This retaining ring 41 has its outer periphery formed as a threaded portion 41a for engagement with the tapped hole 36 in the casing 1' and includes a central through hole 41b for guiding lead wires, etc. therethrough.

Figure 12:
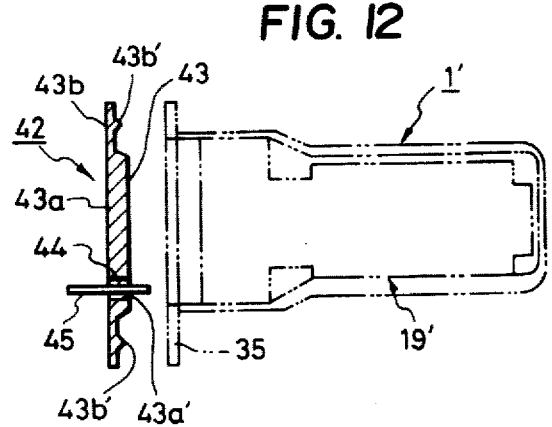
FIG. 12 is a longitudinal sectional view of a gas sealing device used in combination with the sensor body of FIG. 8.

FIG. 12 illustrates a gas sealing device generally designated at 42. This gas sealing device comprises a hermetically sealing base 43 which is made of a metal material and which has a peripheral edge shape corresponding to that of the flange 35 of the outer casing 1' so that the base 43 and the flange 35 can be united together by means of resistance welding. To this end, the base 43 and the flange 35 are made of materials which permit resistance welding as well as compression-type hermetic sealing.

The hermetically sealing base 43 includes a thickened central portion 43a and a thin annular flange 43b formed at the periphery of the portion 43a. The thin flange 43b has an annular protuberance 43b' formed on its inner side surface for projection welding.

The central portion 43a is formed with a through hole 43a' through which a lead wire 45 extends, which wire is retained by a glass piece 44 embedded in the hole 43a'. The piezo-plate 14 in the pump chamber 13 is supplied with electric power through this lead wire 45.

The hole 43a' may also be used for guiding a lead wire for supplying the output of the gas flow sensor 11 to the outside. The above-mentioned glass piece 44 is made of a glass material having a coefficient of thermal expansion close to that of the base 43.

In assembling the angular velocity sensor having the above-mentioned construction, the sensor body 19', the outer casing 1' and the gas sealing device 42 are previously fabricated separately from each other. The sensor body 19' with necessary parts incorporated therein is inserted into the trunk portion 30 of the casing 1' through the opening 34 and located in its predetermined place, followed by screwing the retaining ring 41 into the tapped hole 36 in the casing 1' to immobilize the sensor body 19'.

After completing electrical connections with the lead wire 45, the hermetically sealing base 43 is applied to the flange 35 of the outer casing 1' with its annular protuberance 43b' in contact with an associated face of the flange 35. Thereafter, the base 43 and the flange 35 are held between the two electrodes of a resistance welding machine, not shown. Then, pressure force is applied to the base 43 and the flange 35 towerd each other so as to force the protuberance 43b' to urge the flange 35, while simultaneously welding current is applied to the contact portions of the two members through the electrodes in a concentrated manner to unite them together. Thus, assemblage of the angular velocity sensor is completed.

As set forth above, by virtue of the separate fabrication of the sensor body, casing and gas sealing device constituting the angular velocity sensor the angular velocity sensor can be easily completed merely by incorporating the sensor body into the casing and sealing the casing with the gas sealing device. The assemblage of the sensor is thus facilitated, which enables manufacture of the same on a mass production basis. Furthermore, the use of projection welding makes it possible to achieve completely gapless joining of the flange 35 of the casing 1' and the sealing base 43 of the sealing device 42, which can assure complete sealing effect even with the use of a gas having a small molecular size which is excellent in streamline flow property.

What is claimed is:

1. An angular velocity sensor, which comprises: an outer casing including a central space extending axially thereof, said outer casing being formed of a hollow cylindrical member having one end opened and the other end closed, said hollow cylindrical member having an inner peripheral wall thereof formed with a plurality of inward protuberances extending axially thereof and arranged at circumferentially equal intervals, wherein axially extending gas flow passages are defined between adjacent ones of said inward protuberances and associated outer peripheral surfaces of said inner casing, a plurality of axial gas flow passages formed around said central space, an opening formed in one end thereof and an end wall closing the other end thereof; an inner casing mounted within said outer casing, said inner casing including an opening formed in one end thereof, a hollow cylindrical portion fitted within said central space of said outer casing and defining therein a central gas flow passage extending axially thereof, an end wall provided at the other end thereof and having an axial nozzle hole formed diametrically centrally thereof and communicating with said central gas flow passage and axial gas flow passage in said outer casing, a gas flow sensor holding portion provided in said hollow cylindrical portion in spaced and concentric relation to said nozzle hole, and a pump housing portion provided in said opening in said inner casing; a gas flow sensor fitted in said gas flow sensor holding portion, said gas flow sensor including a pair of thermo-sensitive elements arranged in symmetrical relation with respect to the axis of said nozzle hole for detecting the temperature of a gas jet supplied thereto through said nozzle hole; and pump means incorporated in said pump housing portion for supplying gas into said axial gas flow passages in said outer casing, wherein said hollow cylindrical portion, end wall, gas flow sensor holding portion and pump housing portion of said inner casing are integrally formed of a one-piece structure.

* * * * *